UNITED STATES PATENT OFFICE.

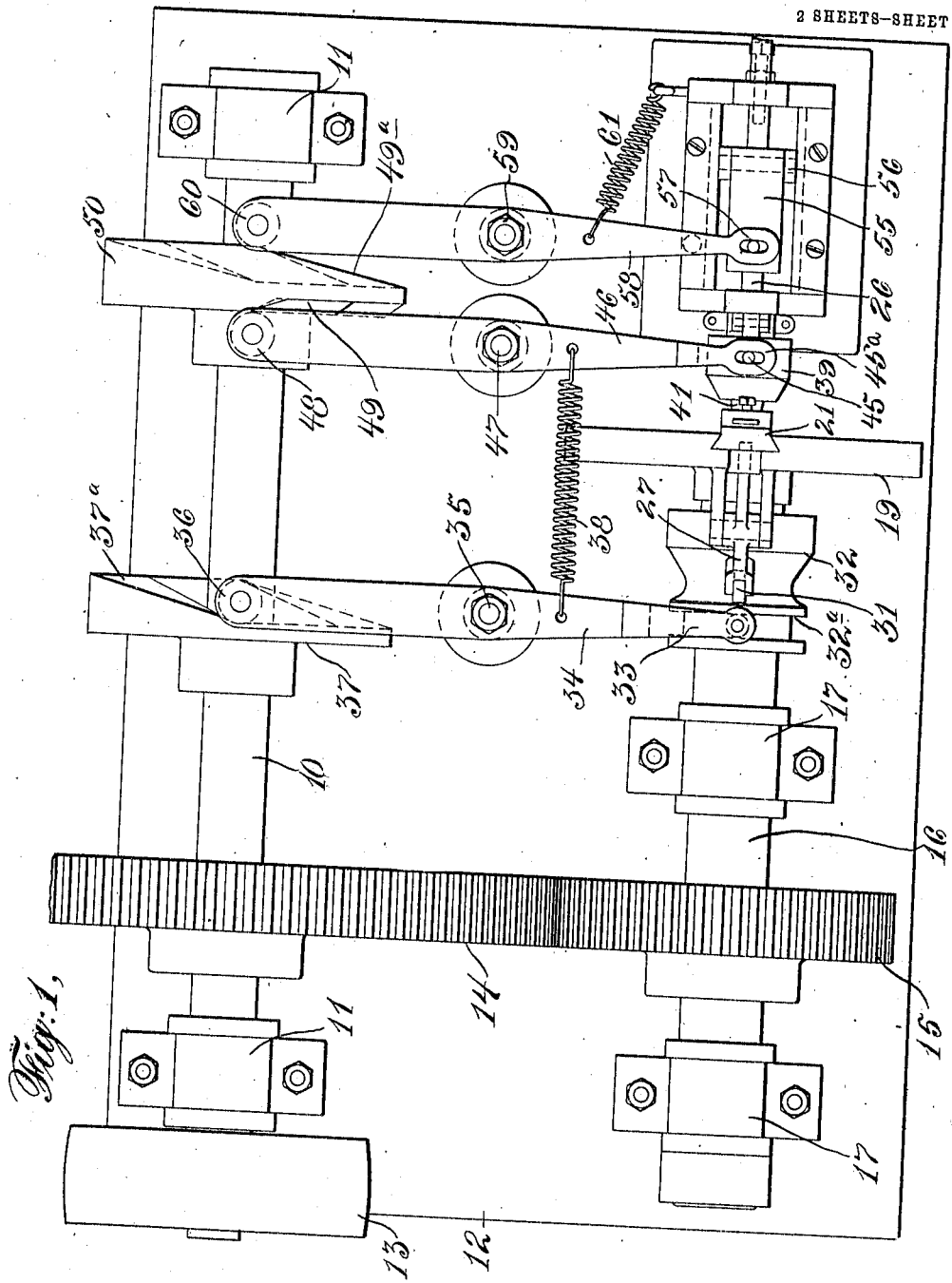

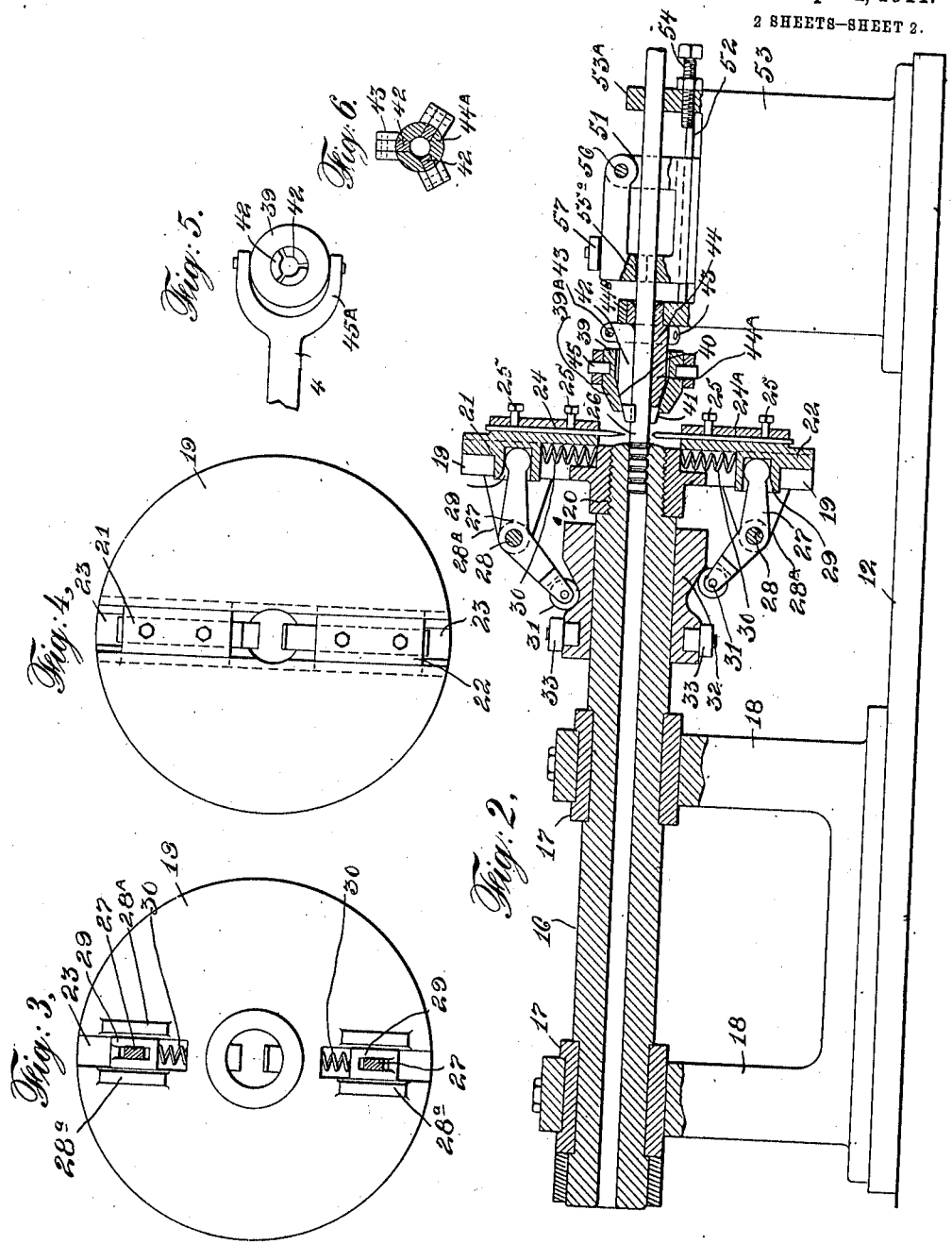

JOHN A. ANDERSON, OF BRIDGEPORT, CONNECTICUT, ASSIGNOR TO CANFIELD RUBBER COMPANY, OF BRIDGEPORT, CONNECTICUT, A CORPORATION OF CONNECTICUT.

MACHINE FOR CUTTING RUBBER DISKS, &c.

988,616.	Specification of Letters Patent.	Patented Apr. 4, 1911.

Application filed June 9, 1910. Serial No. 566,101.

*To all whom it may concern:*

Be it known that I, JOHN A. ANDERSON, of Bridgeport, Fairfield county, Connecticut, have invented a new and useful Improvement in Machines for Cutting Rubber Disks and the Like, of which the following is a full, clear, and exact description.

My invention relates to improvements in machines for cutting rubber washers, disks, and similar articles, which are generally cut from round stock and usually from hollow stock.

The object of my invention is to produce a comparatively simple machine in which a long tube or strip of rubber stock can be inserted and which will then work automatically to feed the stock forward and cut it into disks or washers of the desired thickness.

In carrying out my invention I use a rotary chuck having preferably two knives, one of which works a little in advance of the other and is relatively thin, while the second follows the cut of the first knife, and being a little thicker, cleans out the cut and makes the cut cleaner and smoother. I employ means for feeding these knives gradually toward each other so that as the chuck revolves and the stock is stationary, a clean cut is made and the stock is quickly severed. This is necessary because rubber stock or stock consisting largely of rubber, is very difficult to cut cleanly. In connection with the foregoing cutting mechanism I employ a gripping device to grip the stock and hold it stationary while it is being cut, a feeding device to feed the stock forward, and a hollow shaft to receive the severed members of the stock, that is the disks and washers, etc.

The gripping device grasps the stock while the knives are engaging it, and then automatically releases it to permit the feed to work, and this is arranged to grip and advance the stock while the knives and gripper are out of engagement with it. The means for feeding the disks as they are cut through the hollow shaft, is important, because otherwise they fly about and are difficult to gather.

With these ends in view, and with the general object of producing an efficient machine for cutting disks or similar things from rubber stock, my invention consists of a continuous cutting machine, the structure of which will be hereinafter clearly described and the novel features claimed.

Reference is to be had to the accompanying drawings forming a part of this specification, in which similar reference characters indicate corresponding parts in all the views.

Figure 1 is a plan view of the machine embodying my invention. Fig. 2 is a longitudinal section through the main operative parts of the machine. Fig. 3 is a cross section showing a rear elevation of the chuck. Fig. 4 is a cross section showing the opposite elevation of the chuck. Fig. 5 is a detail showing means for actuating the gripper, and Fig. 6 is a detail cross section through the gripper device.

The machine is provided with a suitable driving shaft 10 which carries the operative cams hereinafter referred to, and is moved in suitable supports 11 carried by a base 12, and the shaft is driven by a pulley 13 or its equivalent. The shaft 10 through the medium of the gears 14 and 15 drives a hollow shaft 16 which is mounted in suitable boxes 17 on the pedestal or post 18 and carries a chuck 19, the hub of which is screwed to the shaft 16 as shown in Fig. 2. The arrangement for driving the shafts is of course immaterial, and whether the shafts are supported on a common base 12 is also immaterial, the essential thing being to drive the shaft 16 at the right speed and to have a parallel shaft carrying operative cams at a reasonable distance from the shaft 16, as will hereinafter appear. The chuck 19 carries slide plates 21—22 which are diametrically opposed but which of course may be radially arranged without being diametrically opposed, if desired, and these slide plates 21 and 22 move in ways 23 and carry knives 24 and 24ª which are fastened by set screws 25 or equivalent fastening devices. The former knife 24 is thinner than the knife 24ª and is slightly more advanced so that as the knives are forced against the stock 26, the thin knife will cut first and the thicker knife following the cut will clean the same. The slide plates are operated by means of elbow levers 27 which are fulcrumed as shown at 28 on brackets 28ª carried by the chuck 19, and the ends of the elbow levers which contact with the slide plates are rounded off and enter sockets 29, although any other connection can be substituted for that shown. The slide plates when pushed inward operate against the resistance of springs 30 which are placed behind the walls of the sockets 29 as shown in Fig. 2. The elbow levers 27 at one end carry rollers 31 which slide on the cone 32, and this moves back and forth on and turns with the shaft 16. It will be seen that when the cone is moved away from the chuck 19, the ends of the levers 27 which contact with the cone are thrown out and the opposite ends are thrown in, thus actuating the knives 24 and 24$^a$ and forcing them into the stock 26, while the opposite movement takes place when the movement of the cone is reversed.

As a convenient means of actuating the cone 32, I have shown a lever 34 having a forked end 33 which engages a groove 32$^a$ in the cone 32, and which is fulcrumed as shown at 35, while its outer end carries a roller 36 contacting with the cam surface 37$^a$ on the side of the cam 37, the latter being fastened to the shaft 10. A spring 38 serves to hold the roller 36 against the face of the cam, and it will be seen that the rotation of the cam will tilt the lever and slide the cone backward and forward.

Obviously the stock 26 must be held securely while the knives are engaging it, and to this end I use a gripping device having a loose collar 39, one end of which is reduced as shown at 39$^a$, and engages a correspondingly inclined part 40 of the gripper fingers 42 which are widened preferably at their outer ends as shown at 41 and are pivoted at the opposite ends as shown at 43 to the ring 44 which has projecting members 44$^A$ extending between the fingers 42 and is secured as shown at 44$^B$ in the adjacent part of the machine frame. It will be seen that when the collar 39 is moved toward the chuck 19, the gripper fingers 42 can spread and permit the stock 26 to be fed freely forward, while when the collar is moved in the opposite direction, it will engage the inclined parts 40 of the gripper fingers and force the ends 41 firmly against the stock, thus holding the latter positively.

As a convenient means for actuating the collar 39, I have shown it pivoted as at 45 to the forked end 45$^a$ of a lever 46, and the latter is fulcrumed as shown at 47, and has at its outer end a roller 48 engaging the cam face 49 of the cam 50 which is fastened to the shaft 10.

As a means for feeding the stock, but without the intention of limiting myself to the precise feed shown, I use the structure described below. A box-like frame 51 slides as shown at 52 in a base or support 53, and its movement is limited by the abutment screw 54 which extends through a flange 53$^a$ of the base 53. The frame 51 has a hinged feed finger 55 which is pivoted as shown at 56 at one end, and has a toothed extension 55$^a$ at the free end, the latter gripping the stock 26, and so when the frame 51 is moved back, the inclined teeth 55$^a$ slide over the stock, but when it is moved forward, the stock is engaged and moved. As a means for moving the feeding device, I have shown the top part or finger 55 connected as shown at 57 with a lever 58, and the latter is fulcrumed at 59 and has a roller 60 contacting with the face 49$^a$ of the cam 50, and the roller and cam are kept in contact by the spring 61 which is secured to the lever 58 and to an adjacent support.

By reference to Fig. 1 it will be seen that the cam faces 37$^a$ and 49 are arranged in relation to the levers 34 and 46 so that the gripper will be operated to secure the stock and the knives advanced to cut it at the same time, and further that when the knives are withdrawn and the gripper released, the cam surface 49$^a$ and lever 58 will cause the feeding device to move forward and advance the stock the necessary distance.

I have tried out the foregoing arrangement in practice and find that it works satisfactorily.

It will of course be evident that the machine can be operated with either one or with a plurality of knives arranged as shown, but I find that the plural knives do the work much better and cut more cleanly than when a single knife is used.

I claim:—

1. In a machine of the kind described, the combination with the hollow rotatable shaft, of a chuck mounted on the shaft and rotatable therewith, a cut-off knife sliding on the chuck, means for feeding the stock opposite the knife and into the hollow rotatable shaft, and a gripping device to hold the stock while it is cut.

2. In a machine of the kind described, the combination with a hollow shaft, of a chuck mounted thereon and rotatable with the shaft, radially arranged sliding knives on the chuck, a cam mechanism for sliding the knives, and means for feeding the stock opposite the knives and into the hollow rotatable shaft.

3. In a machine of the kind described, the combination with the rotatable chuck, of the radially arranged sliding knives thereon, a sliding cone adjacent to the chuck, and levers actuated by the cone and operatively connected with the knives to slide them.

4. A machine of the kind described comprising a rotatable hollow shaft, a chuck on the shaft, sliding knives on the chuck, a cam and lever mechanism for sliding the knives, a gripper opposite the chuck to hold the stock while it is cut, and a feeding device behind the gripper to feed the stock through the gripper and chuck.

5. A machine of the kind described, comprising a feeding device to advance the stock, a gripper through which the stock is passed, said gripper having fingers which impinge on the stock, and a cut-off device opposite the gripper to sever the stock.

6. In a machine of the kind described, the gripping device comprising a collar having an inner inclined surface, fingers pivotally supported and oppositely arranged within the collar, said fingers being hinged and having inclined parts to engage the collar, and means for sliding the collar in relation to the fingers.

7. In a machine of the kind described, the gripping device comprising a series of hinged fingers arranged to permit the passage of stock between them, and a collar inclined in its inner face and arranged to be moved backward and forward over the fingers.

8. In a machine of the kind described, the combination of the cut-off device, the gripping device, and the stock feed, the forward movement of the latter being timed to operate with the release of the knives and the gripping device.

JOHN A. ANDERSON.

Witnesses:
L. V. ROBERTS,
A. M. GUERNSEY.